Nov. 19, 1929.  J. E. SHEAFFER  1,736,725
STOPPER
Filed July 31, 1928
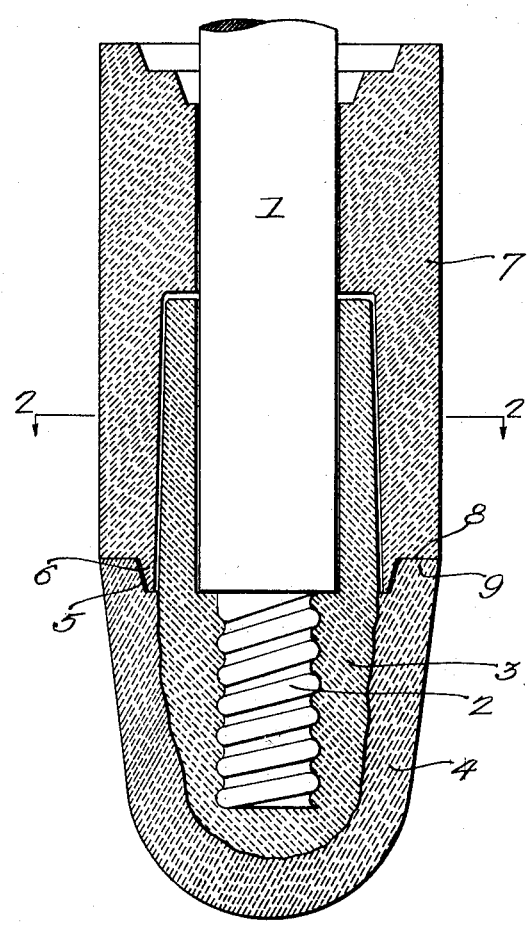
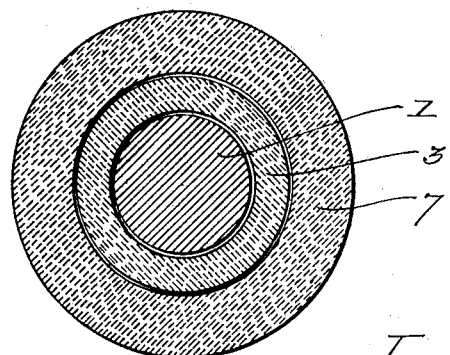
Inventor,
James E. Sheaffer,
by his Attorneys.
Howson & Howson Patented Nov. 19, 1929

1,736,725

UNITED STATES PATENT OFFICE

JAMES E. SHEAFFER, OF BURNHAM, PENNSYLVANIA

STOPPER

Application filed July 31, 1928. Serial No. 296,552.

The object of my invention is to improve the construction of stoppers used in closing the outlet openings in ladles for pouring steel and other molten metals, so that the rod extending through the sleeve-bricks and into the stopper head will not be burned off. This object I attain by extending the clay lining of the stopper head some distance into the lower sleeve-brick, making a protecting enclosure for the lower end of the rod and doing away with an outside sleeve. The invention is an improvement upon the stopper head shown in the patent granted to me on the 19th day of April, numbered 955,704.

In the accompanying drawing:

Fig. 1 is a longitudinal sectional view of the lower end of a stopper, showing the head and the extension of the clay lining; and Fig. 2 is a transverse sectional view on the line 2—2, Fig. 1.

The rod 1 is of metal and has a screw-threaded end 2 adapted to a threaded opening in a lining 3 of clay or other suitable material.

The clay lining is molded in the stopper head 4 which, in the present instance, is of black lead. This head 4 has an annular recess 5 for an annular rib 6 on the end of the lower brick-sleeve 7.

The brick-sleeve has a deep recess 8 for the reception of an extension 9 of the clay lining 3. The parts have preferably a loose fit as shown, but the extension is of sufficient length to prevent molten steel from gaining access to the interior of the lining and burning away the metal stopper rod.

When the stopper head is detached from the rod, the lining and its extension are removed with the head, and a new head can be readily applied to the rod.

While I have shown the rod having a screw connection, other means of attaching the rod to the stopper head may be used without departing from the essential features of the invention.

I claim:

1. The combination of a stopper head; a brick sleeve abutting the stopper head; a lining for said stopper head extending upwardly beyond the joint between the stopper head and the sleeve, said sleeve having a recess in which the extension is located; and a rod extending through the sleeve and through the extension of the lining and attached at its lower end to said lining.

2. The combination of a stopper head; a brick sleeve abutting the stopper head; a lining for the stopper head, said lining extending into the sleeve beyond the joint between said sleeve and said stopper head; and a rod enclosed by the extension and having a screw-thread at its lower end, the lining having a threaded portion in which the threaded end of the rod extends.

3. The combination in a stopper, of a rod having a screw-threaded end; a recessed stopper head; a clay lining in said recess and having a screw-thread adapted to receive the threaded end of the rod, the lining having an integral extension; and a brick-sleeve enclosing the rod and having a deep recess for the extension of the lining, the brick-sleeve abutting the end of the stopper head, one of said parts having an annular rib extending into a recess of the other part.

JAMES E. SHEAFFER.